(12) United States Patent
Jenny et al.

(10) Patent No.: US 7,613,654 B2
(45) Date of Patent: Nov. 3, 2009

(54) USE OF ELECTRONIC DEVICES FOR MONEY TRANSFER

(75) Inventors: Urs Bernhard Jenny, Rickenbach/Merenschwand (CH); Richard H. Rosen, Trumbull, CT (US); Robert G. Schwartz, Branford, CT (US); Brian T. Leary, Milford, CT (US)

(73) Assignee: Neopost Technologies, Bagneux (FR)

( * ) Notice: Subject to any disclaimer, the term of this patent is extended or adjusted under 35 U.S.C. 154(b) by 1426 days.

(21) Appl. No.: 10/356,201

(22) Filed: Jan. 31, 2003

(65) Prior Publication Data

US 2004/0088252 A1    May 6, 2004

Related U.S. Application Data

(60) Provisional application No. 60/422,400, filed on Oct. 30, 2002.

(51) Int. Cl.
*G06Q 20/00* (2006.01)
(52) U.S. Cl. .............. 705/39; 705/26; 705/40; 705/41; 705/401; 235/379; 235/380; 235/381
(58) Field of Classification Search .......... 705/39, 705/40, 41, 42, 43, 44, 400, 401, 403, 406, 705/26; 235/379, 380, 381
See application file for complete search history.

(56) References Cited

U.S. PATENT DOCUMENTS

| | | | | |
|---|---|---|---|---|
| 4,447,890 A | 5/1984 | Duwel et al. | | 364/900 |
| 4,760,532 A | 7/1988 | Sansone et al. | | 364/464 |
| 4,864,506 A | 9/1989 | Storace | | 364/464 |
| 4,873,645 A | 10/1989 | Hunter et al. | | 634/479 |
| 5,526,271 A | 6/1996 | Abumehdi | | 364/464 |
| 5,606,507 A | 2/1997 | Kara | | 364/464.18 |
| 5,699,415 A | 12/1997 | Wagner | | 379/106 |
| 5,787,406 A | 7/1998 | Arsenault et al. | | 705/410 |
| 5,884,292 A * | 3/1999 | Baker et al. | | 705/403 |
| 5,897,625 A * | 4/1999 | Gustin et al. | | 705/43 |
| 5,937,396 A * | 8/1999 | Konya | | 705/43 |
| 6,009,417 A | 12/1999 | Brookner et al. | | 705/410 |
| 6,227,445 B1 * | 5/2001 | Brookner | | 235/379 |
| 6,505,774 B1 * | 1/2003 | Fulcher et al. | | 235/381 |
| 6,575,362 B1 * | 6/2003 | Bator et al. | | 235/381 |
| 2001/0029489 A1 * | 10/2001 | Brookner et al. | | 705/41 |
| 2001/0042052 A1 * | 11/2001 | Leon | | 705/401 |
| 2001/0042055 A1 * | 11/2001 | Didriksen et al. | | 705/407 |
| 2001/0047278 A1 * | 11/2001 | Brookner et al. | | 705/1 |

(Continued)

FOREIGN PATENT DOCUMENTS

DE        3729345 A1    3/1988

(Continued)

*Primary Examiner*—Nga B. Nguyen
(74) *Attorney, Agent, or Firm*—Townsend and Townsend and Crew LLP (57) ABSTRACT

A system for dispensing funds. The system includes a non-dedicated printer adapted to print indicia of a monetary value, and a postal security device coupled to the franking machine. The postal security device includes an accounting register indicative of a value of monetary funds stored in the postal security device. The system also includes a money transfer system coupled to the franking machine and adapted to allow a user to transfer funds from the postal security device to the money transfer system and vice versa.

22 Claims, 14 Drawing Sheets

U.S. PATENT DOCUMENTS

| | | | |
|---|---|---|---|
| 2002/0010640 A1* | 1/2002 | Dutta et al. | 705/26 |
| 2002/0046195 A1 | 4/2002 | Martin et al. | 705/401 |
| 2002/0083019 A1* | 6/2002 | Bystrak et al. | 705/401 |
| 2003/0140017 A1* | 7/2003 | Patton et al. | 705/410 |
| 2003/0187666 A1* | 10/2003 | Leon | 705/1 |
| 2004/0039702 A1* | 2/2004 | Blair et al. | 705/43 |

FOREIGN PATENT DOCUMENTS

| | | | |
|---|---|---|---|
| DE | 3823719 | A1 | 1/1989 |
| DE | 20112350 | U1 | 2/2002 |
| DE | 69430340 | T2 | 11/2002 |
| EP | 0623903 | A3 | 9/1994 |
| EP | 0 623 903 | | 2/1997 |
| EP | 1 061 479 | A2 | 12/2000 |
| WO | WO 98/14909 | | 4/1998 |
| WO | WO 98/14909 | A3 | 4/1998 |
| WO | WO 00/60545 | | 10/2000 |

* cited by examiner

USE OF ELECTRONIC DEVICES FOR MONEY TRANSFER

CROSS-REFERENCE TO RELATED APPLICATIONS

This application claims priority from U.S. Provisional Applications No. 60/422,400, filed Oct. 30, 2002.

BACKGROUND OF THE INVENTION

1. Field of the Invention

The present invention is generally related to postal security devices and in particular to a money transfer system.

2. Brief Description of Related Developments

Postal Security Devices ("PSD") are generally used for printing postage, for example, meter indicia. A postage meter using a postal security device together with a printing device can print various forms of postage stamps. One example of such a postal security device and franking machine is described in U.S. Pat. No. 6,009,417, the disclosure of which is incorporated herein by reference in its entirety.

SUMMARY OF THE INVENTION

The present invention is directed to a system for dispensing funds. In one embodiment the system comprises a non-dedicated printer adapted to print indicia of a monetary value, and a postal security device coupled to the franking machine. The postal security device includes an accounting register indicative of a value of monetary funds stored in the postal security device. The system also includes a money transfer system coupled to the franking machine and adapted to allow a user to transfer funds from the postal security device to the money transfer system and vice versa.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(s)

Figure 1:
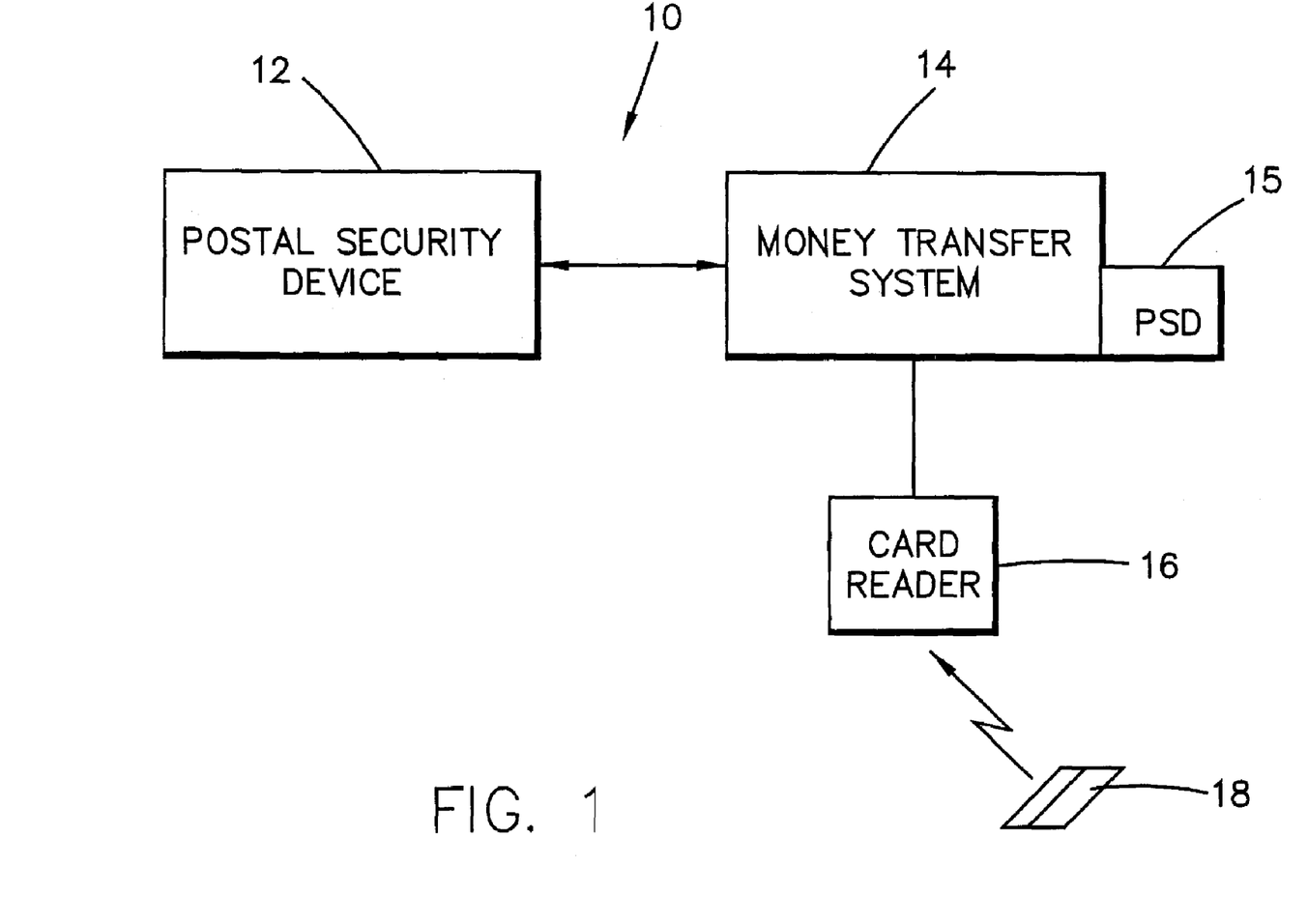
FIG. 1 is a block diagram of one embodiment of a system incorporating features of the present invention.

The block diagram in FIG. 1 shows a system 10 incorporating features of the present invention. Although the present invention will be described with reference to the embodiment shown in the drawings, it should be understood that the present invention can be embodied in many alternate forms. In addition, any suitable size, shape or type of elements or materials could be used.

The system 10 shown in FIG. 1 generally comprises a postal security device 12 and a money or other monetary value transfer system 14. In alternate embodiments the system 10 can include such other suitable components for securely managing funds using cryptographic techniques. The system 10 can also securely dispense postage and print a meter indicia in an electronically readable form. It is a feature of the present invention to control and manage the disbursement of funds for business-type transactions or e-commerce type transactions.

The postal security device 12 is generally adapted to securely manage funds. The funds can be added or deleted from the postal security device 12. Ascending and descending registers within the cryptographically secure postal security device provide this functionality. When the postal security device is coupled to a franking machine, the system can print indicia, such as for example postal indicia. The postal security device can be adapted to operate locally, such as through a direct or network connection, or remotely, via the Internet for example.

Figure 6A:
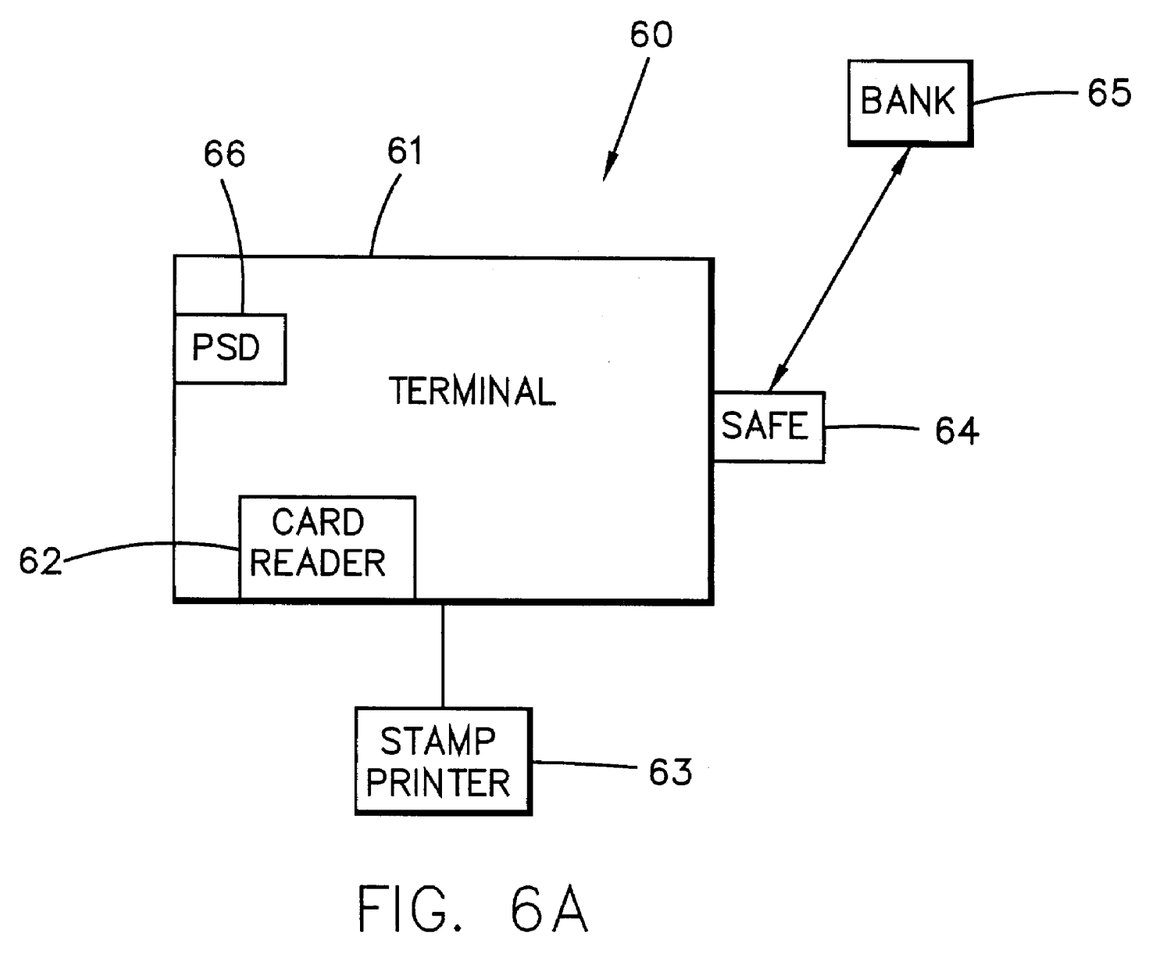
FIG. 6a is a block diagram of an embodiment of a system incorporating features of the present invention illustrating use of a secure money transfer system.
Figure 10:
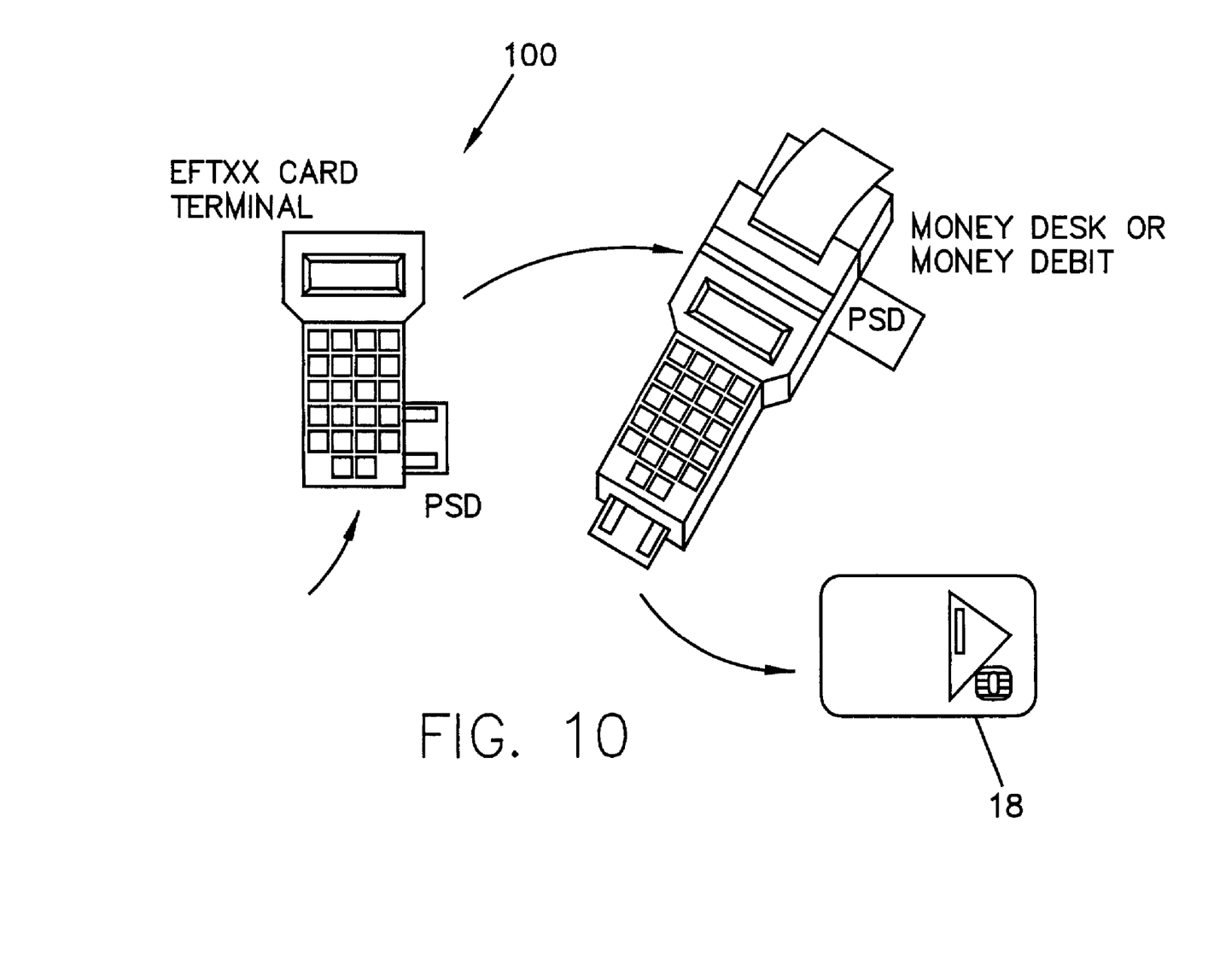
FIG. 10 is a diagram of an embodiment of a system incorporating features of the present invention using a card terminal adapted to transfer funds over a telephone line service to a "Money Desk" or "Money Debit" handheld terminal using standard credit card or debit card authorization procedures.
Figure 11:
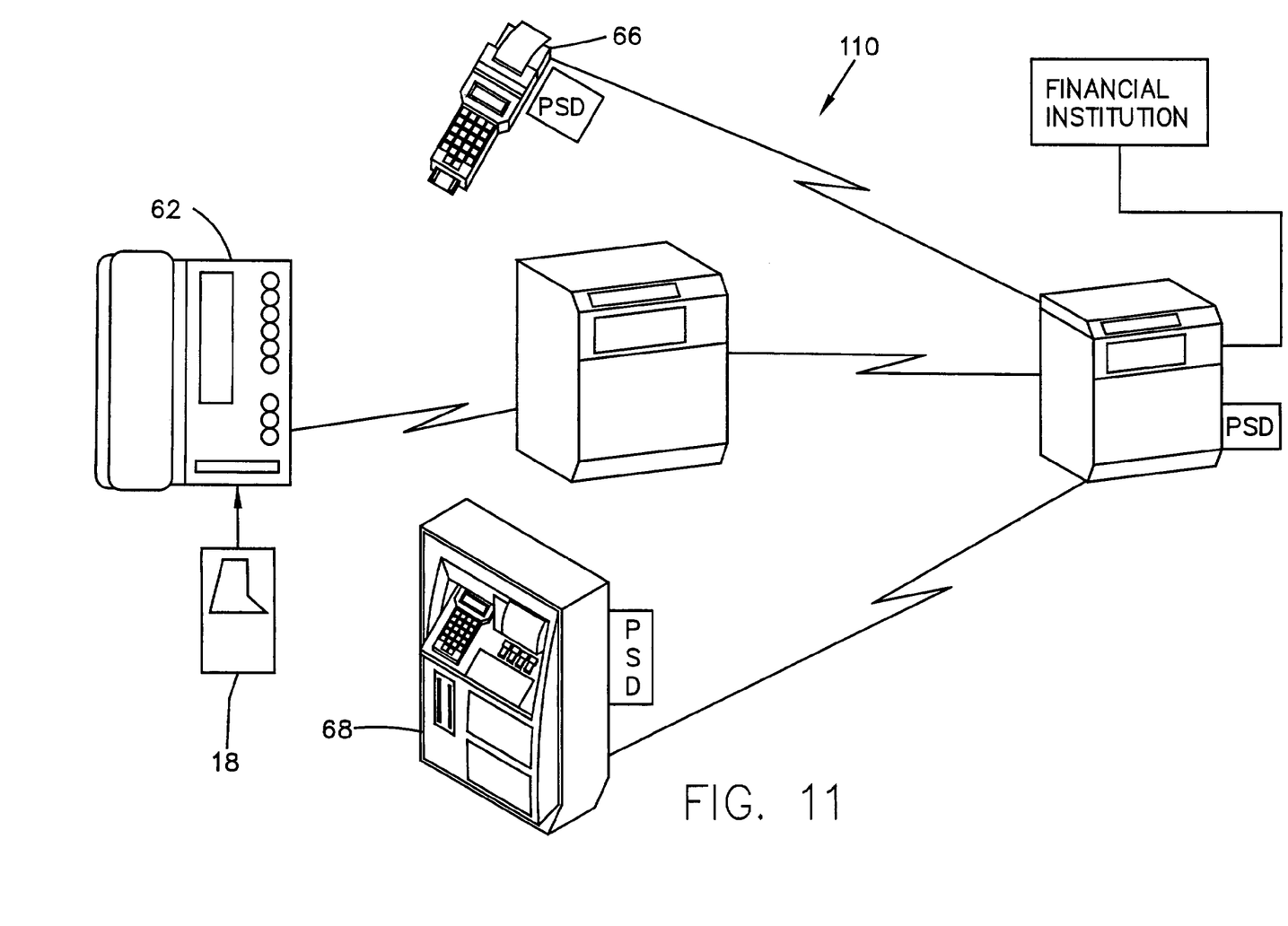
FIG. 11 is a diagram of an embodiment of a system incorporating features of the present invention in a hospital patient and staff telephone solution.

The money transfer system 14 generally allows a user to transfer funds to or from the postal security device 12. In one embodiment, the money transfer system 14 includes a smart card reader 16 into which an electronic wallet in form of a smart card can be inserted. The card reader 16 is generally an electronic device adapted to read data from, or add data to, an electronic or computer readable medium. This medium can be a smart card. In alternate embodiments the electronic wallet can comprise any suitable electronic medium for storing and transferring funds. It is a feature of the present invention to allow a user to transfer digital money from the PSD device 15 to his personal electronic wallet, which is preferably a smart card. The transfer could operate in the reverse manner as well, by transferring funds from the electronic wallet to the PSD 15. The smart card reader 16 can be used to transfer funds to or from a smart card 18. For example, by linking the card reader 16 to a telephone line-based or web-based debit or credit authorization service, an end user could load a "personal" PSD with digital money using standard debit or credit card authorization procedures as illustrated in FIG. 10. In one embodiment, the funds transfer device on system 14 of FIG. 1 could comprise an ATM terminal 61 as shown in FIG. 6A. The ATM terminal 61 could include its own PSD 66.

Figure 6B:
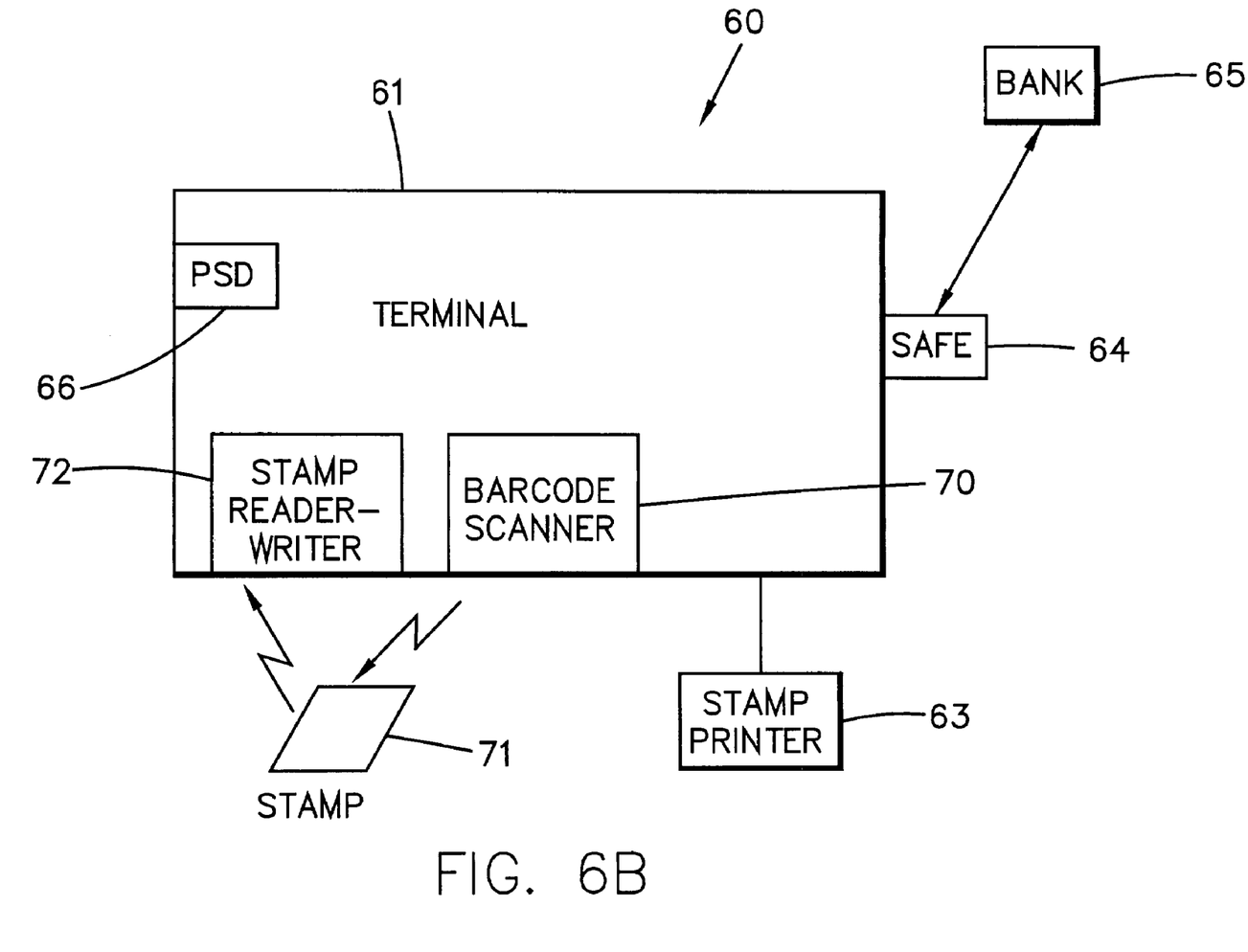
FIG. 6b is a block diagram of an embodiment of a system incorporating features of the present invention illustrating use of a secure money transfer system incorporating a stamp reader-writer and a bar code scanner.

FIG. 6B illustrates another embodiment of a terminal 61 where a stamp reader-writer 72 and a bar code scanner 70 are integrated into the terminal 61. The stamp reader writer 72 is connected to the bar code scanner 70. A user can insert stamps 71 into the reader-writer 72 and a code on the stamp is validated by the bar code scanner 70.

Figure 2:
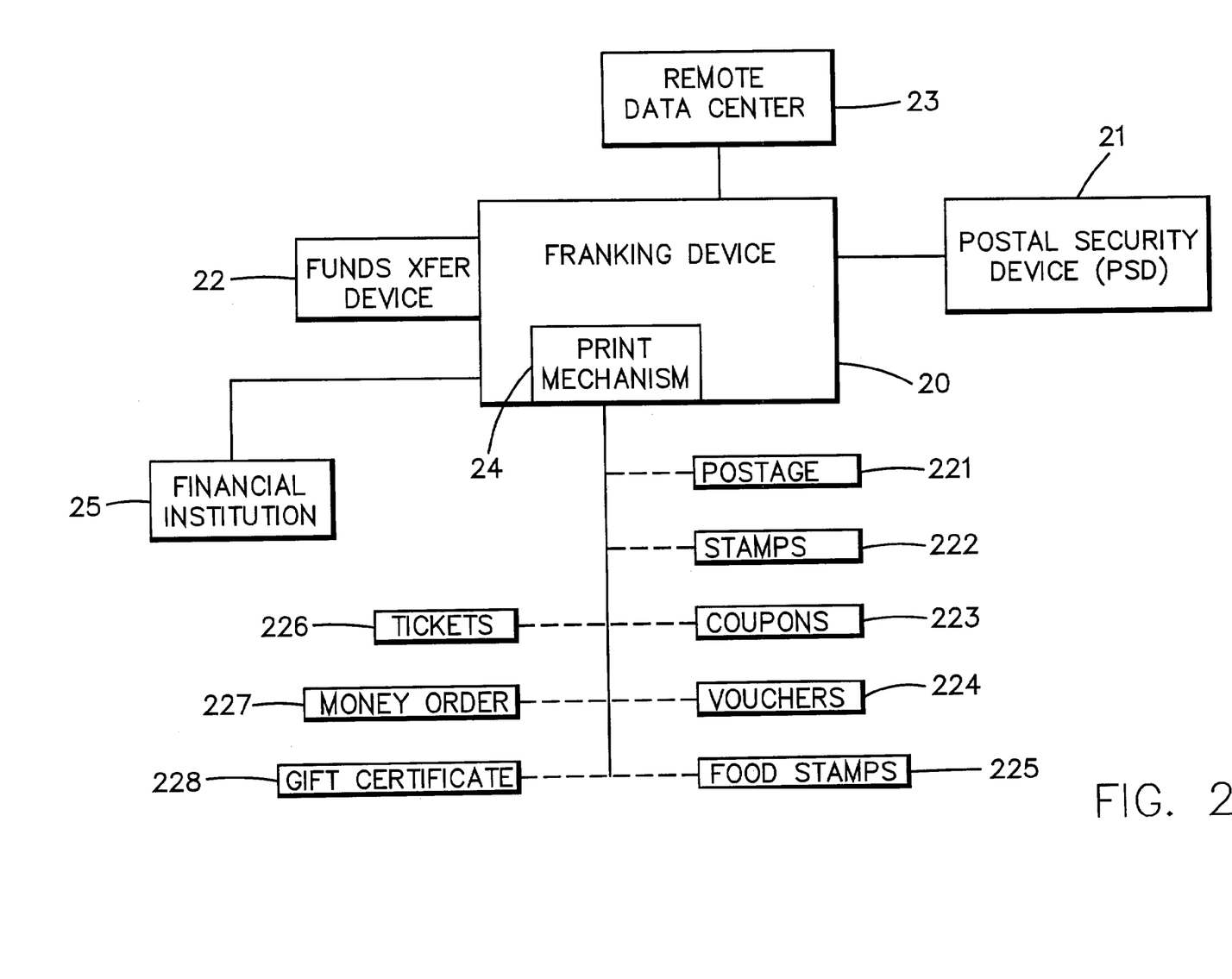
FIG. 2 is a block diagram of another embodiment of a system incorporating features of the present invention.
Figure 8:
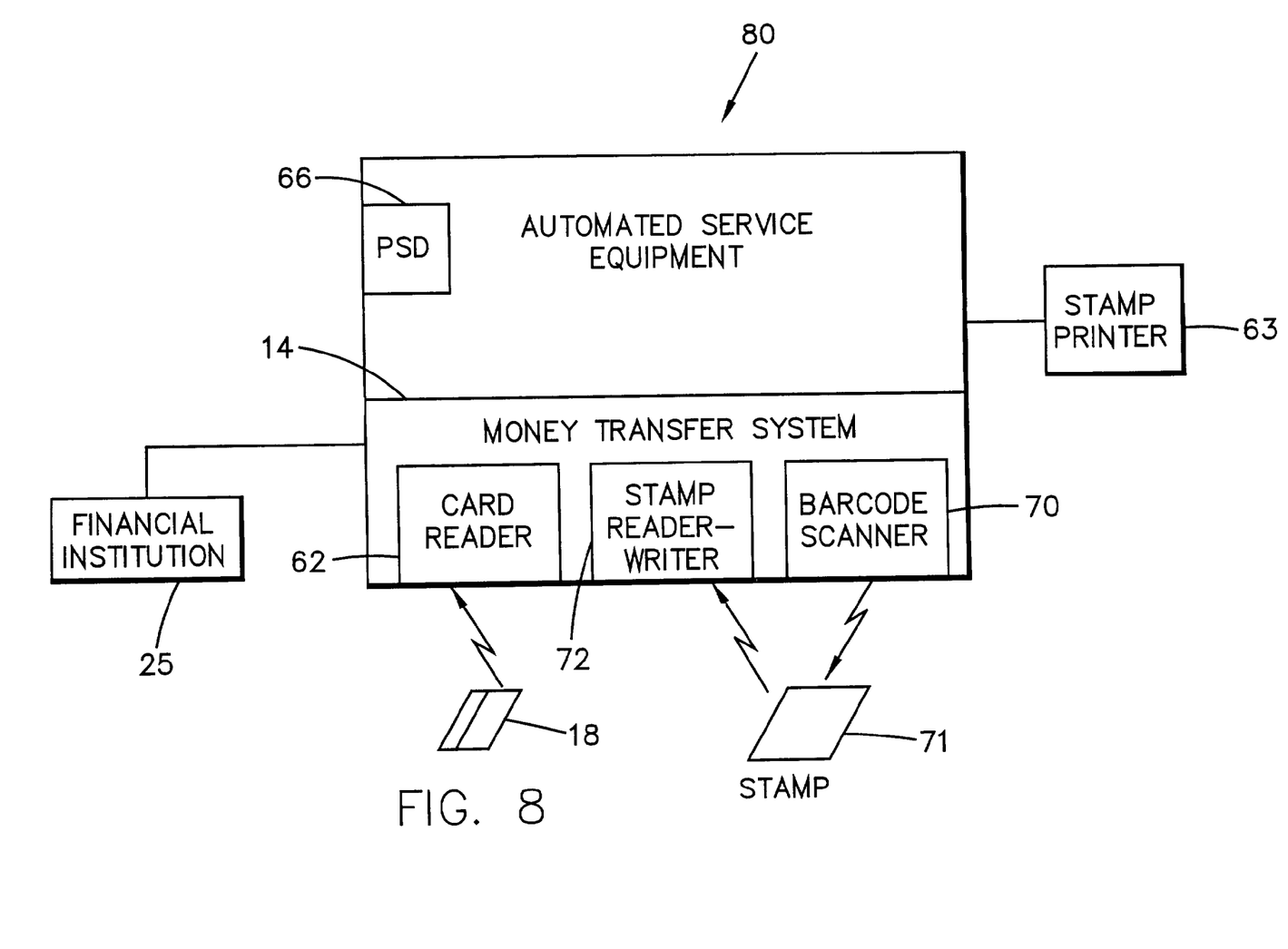
FIG. 8 is a block diagram of an application incorporating features of the present invention in an Automated Service Equipment.

In one application referring to FIG. 2, the postal security device can securely dispense funds by printing for example postage 221, stamps 222, coupons 223, vouchers 224, food stamps 225, tickets 226, money orders 227 or gift certificates 228 that can be redeemed at an appropriate institution. In another embodiment such as illustrated in FIG. 6, where the subject stamps can constitute a secure form of legal tender, this alternative "money" can be used as payment by inserting it into a Stamp Reader-Writer 72 of an Automated Service Equipment 80 such as illustrated in FIG. 8. The stamps, coupons, vouchers, or any other suitable form of alternative "money" could be used to purchase merchandise or services, for example, or to serve as an electronic payment receipt in form of a ticket allowing access to car parks, cinemas, theatres, football stadiums, trade fairs etc. or to public transport services offered by subway, bus, train, light train or tramway. The merchant could take the stamp 222 or other medium to a bank or other clearing house for redemption or payment. Each individual stamp can be printed with a two-dimensional bar code and cryptographically signed. Other verification means could also be used. Thus, the code can easily be read by a bar code scanner for confirmation that it is a valid code. In one embodiment, this could involve checking the code against a set of codes in a central database. One example of such a verification system is described in U.S. patent application Ser. No. 09/950,380, filed on Sep. 16, 2001, the disclosure of which is incorporated herein by reference in its entirety. Special printing techniques can be employed to prevent copying so that each stamp (coupon, voucher or ticket) cannot be counterfeited.

In one application referring to FIG. 2, a non-dedicated printer or a franking device 20 is coupled to a postal security device 21 and a funds or money transfer device 22. The funds transfer device 22 can include a card reader 16 described with reference to FIG. 1. In the system shown in FIG. 2, the postage meter or franking machine 20 is connected to the funds transfer device 22 in a manner that allows users to add funds from their postal security device 21 to their smart card. Additional funds could be added to the postal security device 21 from the financial institution 25 via a TMS/KMS reloading system.

Figure 3:
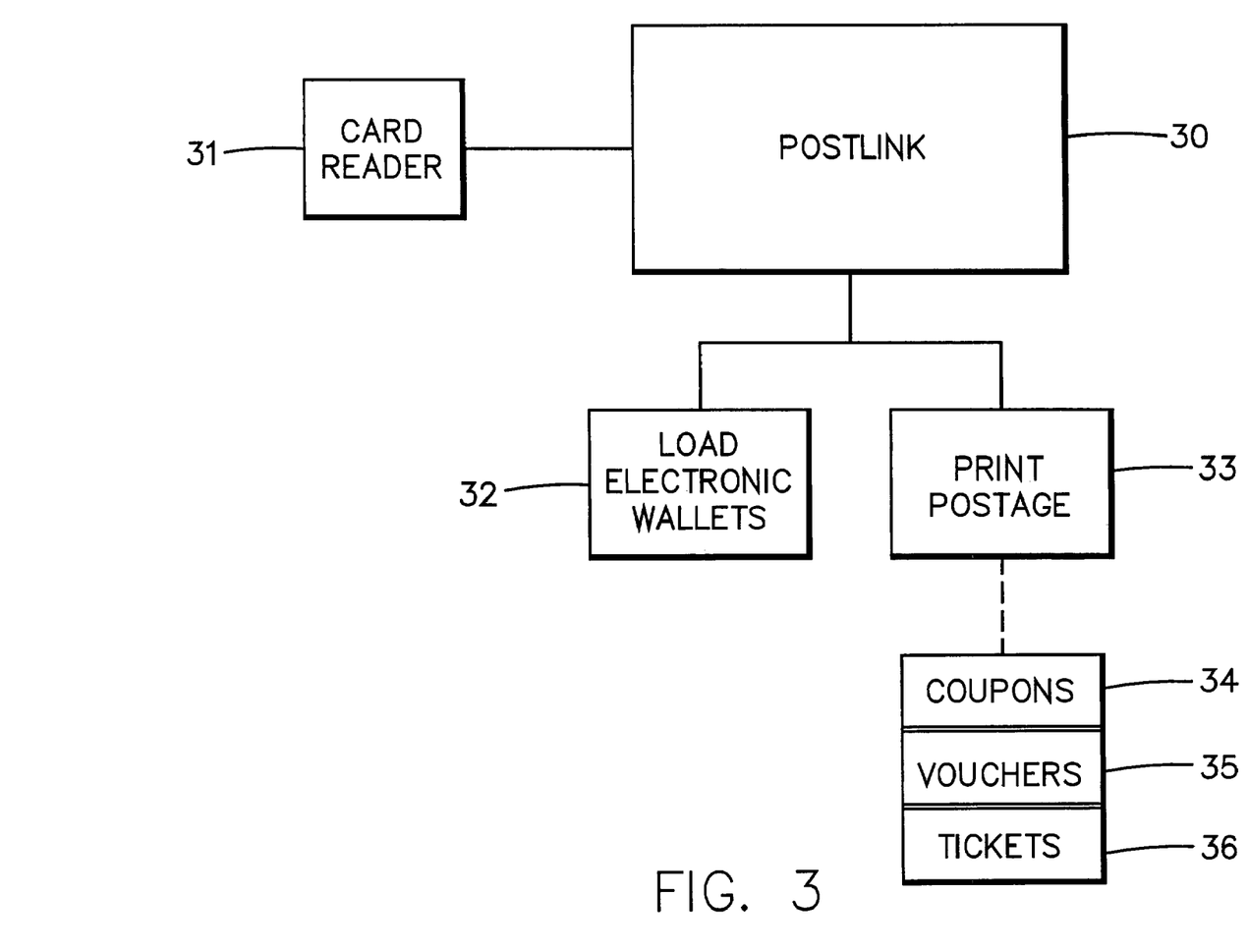
FIG. 3 is a block diagram of a POSTLINK™ mailing system incorporating features of the present invention.

Referring to FIG. 3, in one embodiment the present invention can be incorporated in a POSTLINK™ mailing system 30 manufactured by Hasler, Inc. with headquarters in Shelton, Conn. As shown in FIG. 3, a card reader 31 or other such suitable system is coupled to the POSTLINK™ System 30. The POSTLINK System 30 can include a PSD, either as an internal device or an external device. By incorporating the present invention in the POSTLINK 30, a POSTLINK owner can process payments via the owner's postal account using the PSD of the POSTLINK™ franking machine. An indicia-based printout from the printing device 33, such as for example coupons 34, vouchers 35 or tickets 36 or the media 221-228 described with reference to FIG. 2, can be used as a payment receipt.

Figure 4:
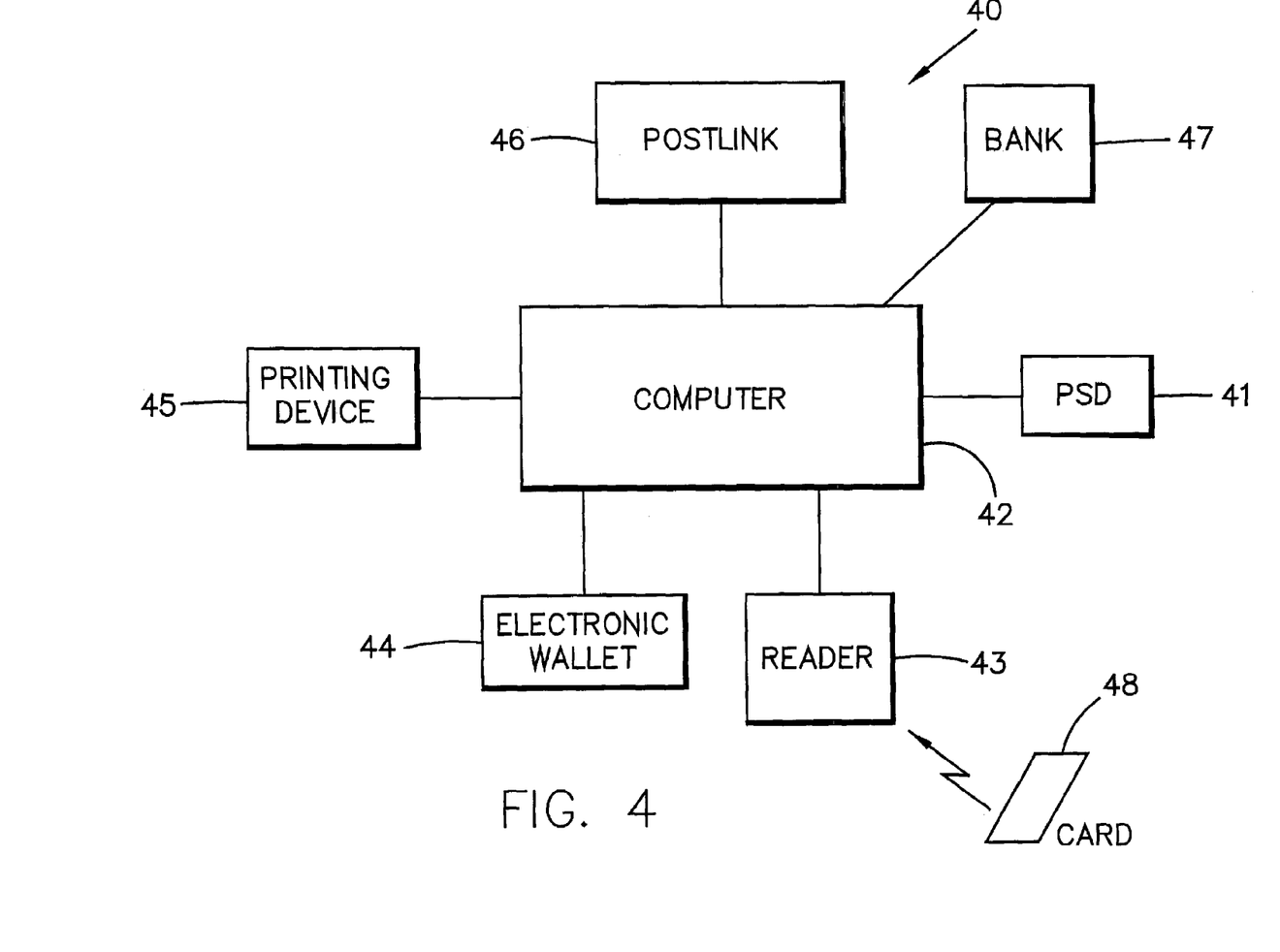
FIG. 4 is a block design of an embodiment of a funds transfer system incorporating features of the present invention

In a typical postage meter system, a dedicated printer is associated with the franking machine and postal security device to print the postal indicia. FIG. 4 shows an application in which, instead of having a dedicated printing solution as in a postage meter that utilizes a PSD, it is possible to use the PSD 41 in conjunction with a computing device 42, for example a personal computer, and a non-dedicated printing device 45 to print postage or other indicia. The PSD can be integrated either directly on the computer's motherboard or on a separate add-on-board. For example, in the system 40 of FIG. 4, it is possible to connect the computer 42 and PSD 41 to the card reader 43 to allow a user to transfer funds from the PSD 41 to a smart card 48 or the electronic wallet 44.

Figure 5:
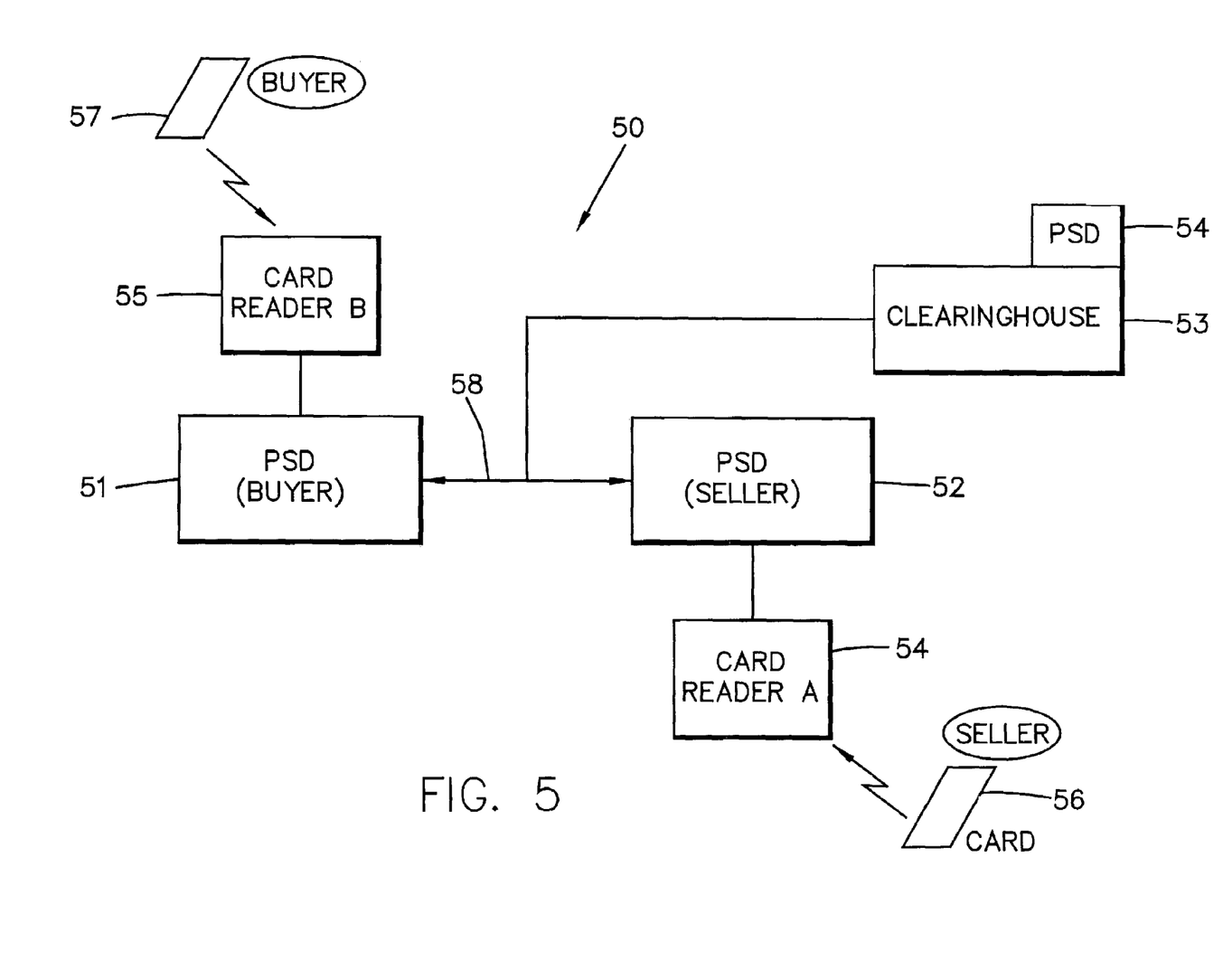
FIG. 5 is a block diagram of one embodiment of a system incorporating features of the present invention illustrating two postal security devices communicating with one another.

Referring to FIG. 5, since a postal security device can securely manage funds that are added to and deleted from it via the ascending and descending registers, it is possible for two postal security devices 51, 52 to transfer funds between themselves. For example, in an e-commerce transaction involving at least two participants, the buyer can transfer funds from the buyer's PSD 51 to the seller's PSD 52. The PSDs 51, 52 could be connected to each other via a network 58, for example a LAN, or through the Internet. In this fashion, the seller receives the funds from the buyer immediately and has immediate knowledge that the buyer has sufficient, available funds. In one embodiment as depicted in FIG. 5, the 'Clearing House' function 53 can be incorporated in a Web-based distributed internet transaction broker application operated by an independent service provider. Such an application has been developed by online SOLUTIONS® GmbH, a Swiss company owned by Urs Bernhard Jenny, as part of the WYSE project of the Swiss Federal Institute of Technology Zurich. This application can be adapted to communicate with postal security devices using cryptographic communications channels for establishing secure communications with remote hosts for transferring funds between the various postal security devices involved. In this embodiment an independent Internet Payment Brokerage Service organisation depicted as 'Clearing House' in FIG. 5 can offer automated Internet Payment Brokerage Services to buyers and sellers based on their respective PSD's and on the broker's own Web-based distributed Internet transaction broker application, for the use of which the seller pays a commission to the broker by having the funds received from the buyer split and by transferring a certain percentage of the deal amount to the broker's own PSD 54. By exchanging funds between the PSD's 51, 52 and 54 no personal credit or banking information is required to be input via the Internet 58 that might jeopardize confidential information. In the embodiment shown in FIG. 5 there is no minimum limit other than the lowest currency denomination as to the amount of funds to be transferred, which makes the invention suitable for internet payments, e-business and fee-based database queries based on micro payments or fractions of currency denominations.

Figure 6C:
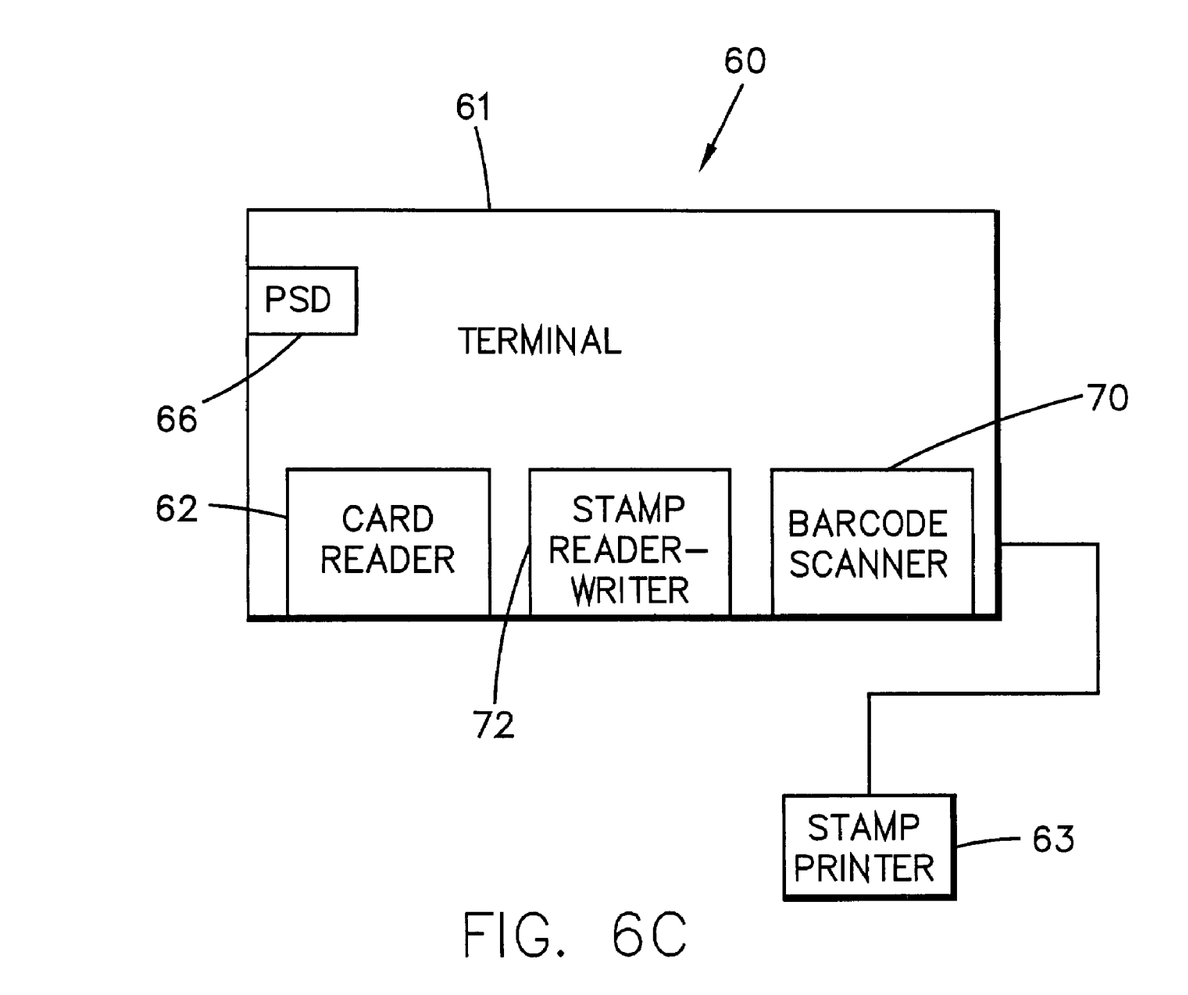
FIG. 6c is a block diagram of an embodiment of a system incorporating features of the present invention illustrating use of a secure money transfer system incorporating a stamp reader-writer, bar code scanner and a card reader.
Figure 7:
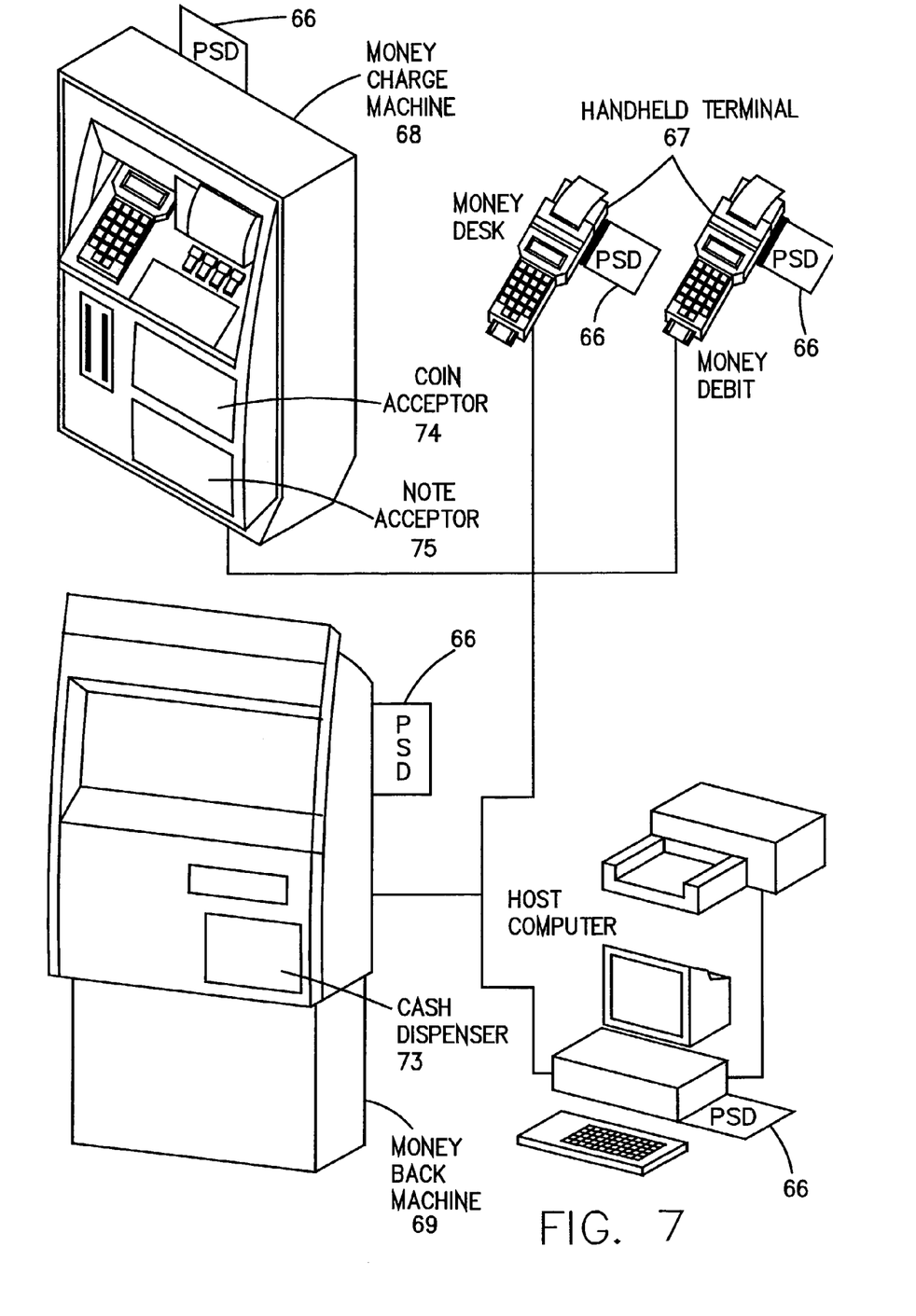
FIG. 7 is a diagram of an application of a system incorporating features of the present invention including a "Money Charge" machine, a "Money Back" machine as well as two Handheld Terminals named "Money Desk" and "Money Debit".

In another embodiment as shown in FIG. 7 and as developed by ASCOM, the ATM function can be incorporated in an existing product line of four machines named 'MONEY CHARGE' 68, 'MONEY BACK' 69, 'MONEY DESK' and 'MONEY DEBIT' 67 respectively. Customers could use the PSD equipped ATM 61 or the 'MONEY CHARGE' machine 68 to load their Smart Card and the 'MONEY BACK' machine 69 to transfer funds from their Smart Card to the PSD 66 in order to receive cash in return from the Cash Dispenser 73 of the SAFE 64 in the form of bank notes or coins or subject stamps (or coupons, or vouchers) 71 from the Stamp Printer 63 that ensures a secure form of legal tender. In one embodiment, as illustrated in FIG. 6c, instead of having to load an ATM with currency, the terminal or ATM 61 could print "money" in the form of the subject stamps (coupons or vouchers).

The ATM function based on stamps (coupons, vouchers or tickets) could also be accomplished by using a portable device, for example a Handheld Terminal like Ascom's 'Money Desk' or 'Money Debit' machine 67, or by using a PDA or telephone equipped with a Smart Card reader, PSD and printer.

Referring to FIG. 8, in one application the present invention could be incorporated in any kind of Automated Service Equipment System 80 such as a TVM (ticket vending machine), a dispenser (food, beverage, soap, newspaper dispenser, etc.), a turnpike or tollgate device or in a slot machine. In the system shown in FIG. 8 the postal security device 66 is connected to the money transfer system 14 in a manner that allows users to add funds from their smart card 18 to the postal security device 66 while receiving in return the desired automated merchandise or service (e.g. food, beverage etc., game or open turnpike/gate giving access to subway, car park etc. and/or dispensing a receipt, ticket etc. The postal security device 66 can be connected to the financial institution 25 in a manner that allows the owner of the Automated Service Equipment 80 to have the newly added funds automatically transferred from the postal security device 66 via TMS/KMS to the financial institution 25. This has the advantage that physical funds collection at the Automated Service Equipment level is unnecessary and that the funds immediately start to bear interest on the owner's underlying account, at the financial institution. In the embodiment shown in FIG. 8 the system also comprises a Stamp Reader-Writer 72 connected to a Bar Code Scanner 70 allowing a user to insert stamps (vouchers or coupons). The cryptographically signed bar code on the stamp is validated by the bar code scanner 70. In one application the stamps 71 may represent a secure form of legal tender as described with reference to FIGS. 6A and 6B. The Stamp Reader-Writer 72 is connected to the money transfer system 14 in a manner that allows users to transform alternative "money" in form of the subject stamps 71 into digital money on the postal security device 66 while receiving in return the desired automated service. The Stamp Reader-Writer 72, in this case, after validation of the stamps 71 and in parallel to the transfer of the funds to the postal security device 66 overwrites the subject stamps 71 thus cancelling them completely. An example of a verification system is described in U.S. patent application Ser. No. 09/950,380, filed on Sep. 16, 2001, the disclosure of which is incorporated herein by reference in its entirety. The bar code is checked against a set of codes in a central database and the automated service is then provided.

Figure 9:
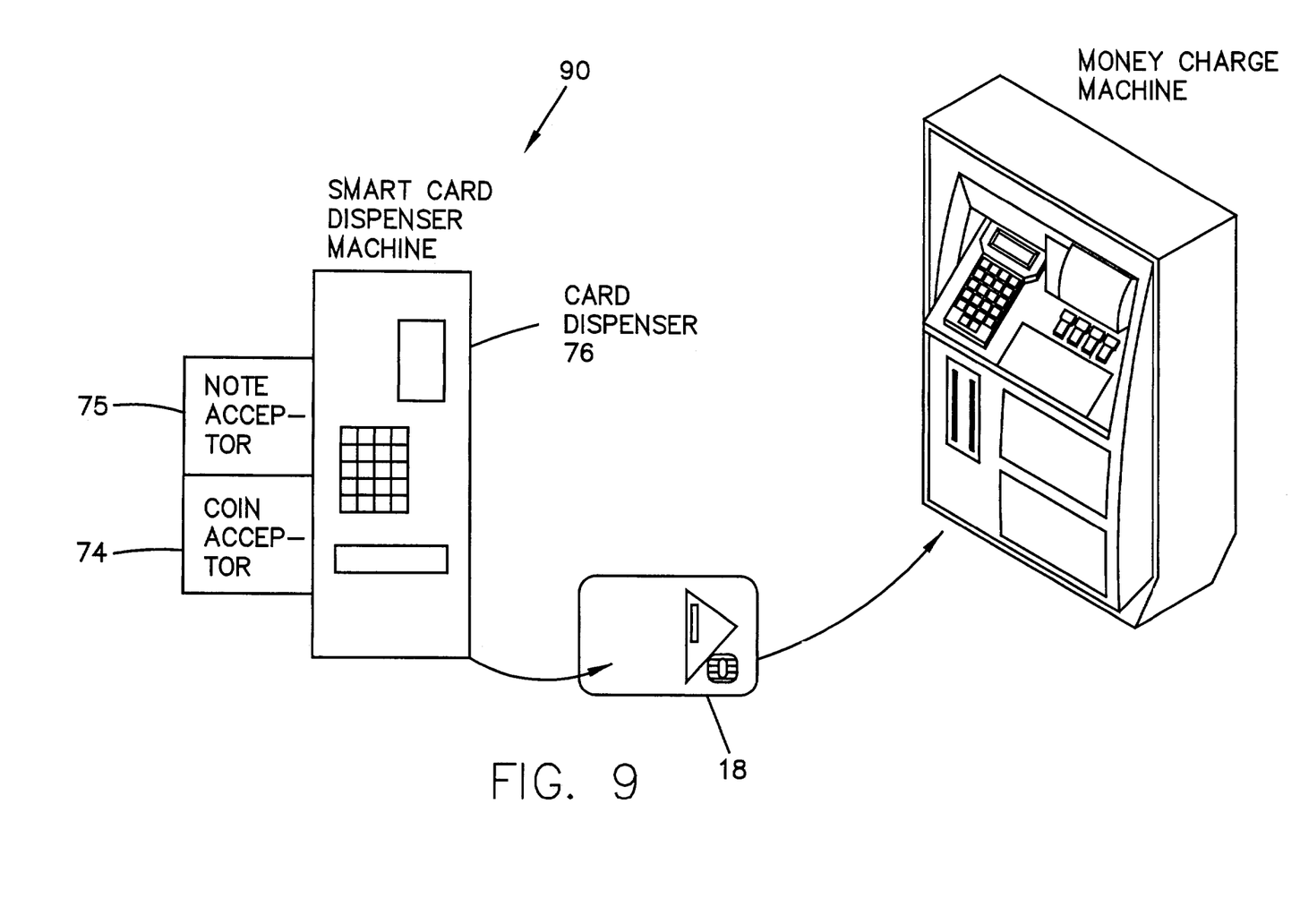
FIG. 9 is a block diagram of an embodiment of a system incorporating features of the present invention using a telephone card dispenser adapted to give out smart cards instead of telephone cards and incorporating a coin handling system, in addition.

In one application, the funds transfer system could comprise a Smart Card Dispenser Machine 90 as shown in FIG. 9. Such a machine has been developed for NTT by Yoichi Saiga of Ascom Hasler (Japan) Inc. The machine can be adapted to dispense smart cards instead of IC telephone cards. Also a coin handling system can be added in addition.

Referring to FIG. 10, in one application the present invention can be incorporated in a Nortel Meridian hospital patient and staff telephone system 110 adapted to handle smart card-based call payment from card reader-equipped phone terminals.

Figure 12:
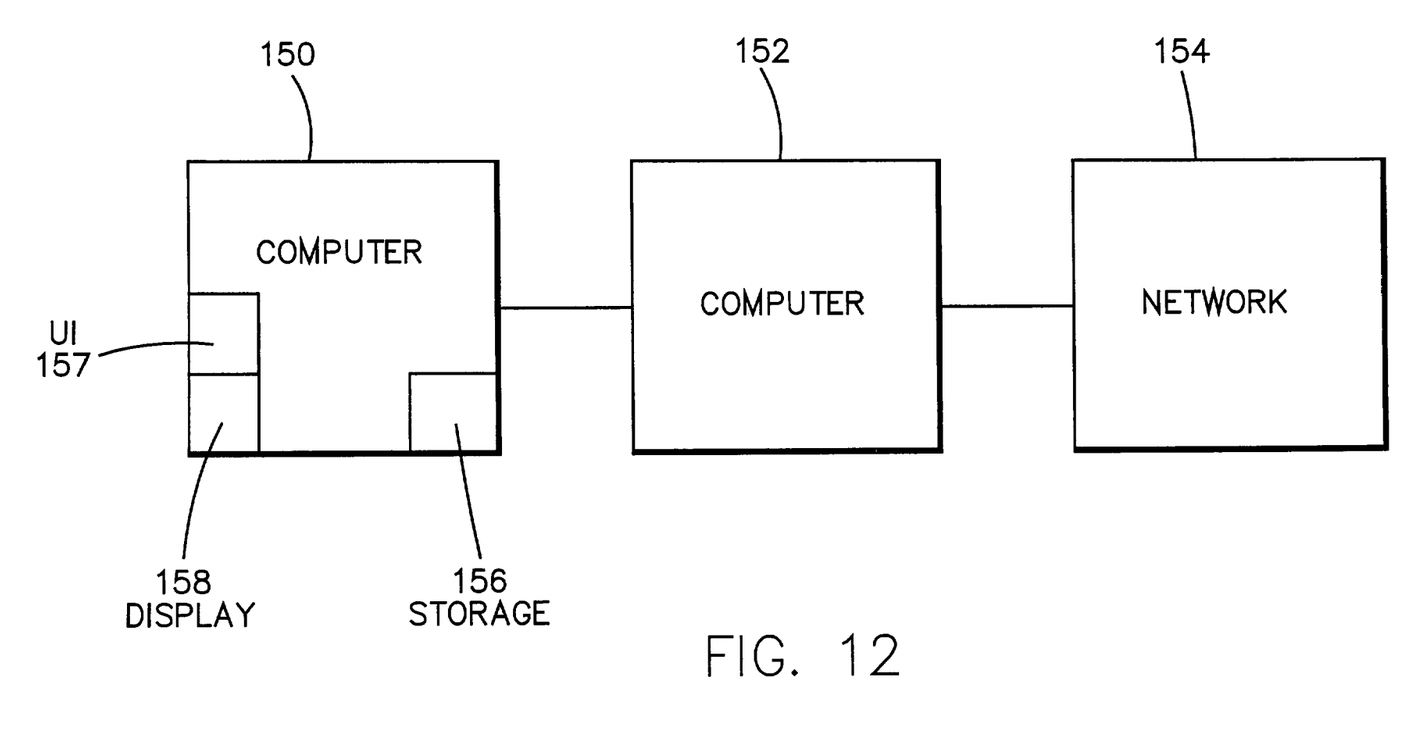
FIG. 12 is a block diagram of a typical apparatus that may be used to practice the present invention.

The present invention may also include software and computer programs incorporating the process steps and instructions described above that are executed in different computers. In the preferred embodiment, the computers are connected to the Internet. FIG. 12 is a block diagram of one embodiment of a typical apparatus incorporating features of the present invention that may be used to practice the present invention. As shown, a computer system 150 may be linked to another computer system 152, such that the computers 150 and 152 are capable of sending information to each other and receiving information from each other. In one embodiment, computer system 152 could include a server computer adapted to communicate with a network 154, such as for example, the Internet. Computer systems 150 and 152 can be linked together in any conventional manner including a modem, hard wire connection, or fiber optic link. Generally, information can be made available to both computer systems 150 and 152 using a communication protocol typically sent over a communication channel or through a dial-up connection on ISDN line. Computers 150 and 152 are generally adapted to utilize program storage devices embodying machine readable program source code which is adapted to cause the computers 150 and 152 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 150 and 152 may also include a microprocessor for executing stored programs. Computer 150 may include a data storage device 156 on its program storage device for the storage of information and data. The computer program or software incorporating the processes and method steps incorporating features of the present invention may be stored in one or more computers 150 and 152 on an otherwise conventional program storage device. In one embodiment, computers 150 and 152 may include a user interface 157, and a display interface 158 from which features of the present invention can be accessed. The user interface 157 and the display interface 158 can be adapted to allow the input of queries and commands to the system, as well as present the results of the commands and queries.

It should be understood that the foregoing description is only illustrative of the invention. Various alternatives and modifications can be devised by those skilled in the art without departing from the invention. Accordingly, the present invention is intended to embrace all such alternatives, modifications and variants which fall within the scope of the appended claims.

What is claimed is:

1. A system for dispensing funds comprising:
 a franking machine having a non-dedicated printer adapted to print indicia of a monetary value;
 a first postal security device coupled to the franking machine, the postal security device including an accounting register indicative of a value of monetary funds stored in the postal security device; and
 a money transfer system coupled to the franking machine, wherein the money transfer system receives alternative money in the form of a stamp, cancels the alternative money, transfers funds between the postal security device and the money transfer system, establishes a communication link with a second postal security device, and transfers funds between the first postal security device and the second postal security device;

wherein the transferred funds correspond to a payment from a user of the first postal security device to a user of the second postal security device.

2. The system of claim 1 wherein the monetary transfer system comprises a card reader adapted to transfer funds between the postal security device and a smart card.

3. The system of claim 1 wherein the monetary transfer system comprises a printing device adapted to print monetary indicia on a printable medium that can be redeemed for monetary funds.

4. The system of claim 3 wherein the printable medium is a stamp, coupon, voucher or a ticket.

5. The system of claim 1 wherein the money transfer system comprises a Web-based distributed Internet transaction broker application.

6. The system of claim 1 wherein each of the first postal security device and of the second postal security devices includes cryptographic communications channels for establishing secure communications with a respective remote host for transferring funds among the respective remote host, the first postal security device and the second postal security device.

7. The system of claim 1 wherein the monetary storage medium is a credit card or a debit card.

8. The system of claim 1 wherein the money transfer system comprises:
a computing device that establishes a communication connection with the franking machine; and
a postal security device connected to the computing device, that transfers funds from the first postal security device to a portable storage medium.

9. The system of claim 1 wherein the non-dedicated printer comprises a franking machine.

10. The system of claim 1 wherein the indicia comprises proof of payment indicia, or valid funds indicia.

11. The system of claim 1 wherein the money transfer system comprises a bank note handling system and a coin handling system.

12. The system of claim 11 wherein the money transfer system receives at least one of bank notes and coins and transfers an equal amount of funds to the monetary storage medium from the postal security device.

13. The system of claim 1 wherein the money transfer system comprises the second postal security device.

14. The system of claim 11 wherein the money transfer system transfers funds from the money transfer system to the postal security device and subsequently provide stamps, vouchers or coupons printed by the franking machine to a user.

15. The system of claim 11 wherein the money transfer system allows the user to receive in return, after the transfer of funds, a desired merchandise or service, and wherein the postal security device establishes secure communications based on cryptographic communications channels with a remote host and to transfer the funds to that host.

16. The system of claim 11 wherein the postal security device establishes secure communications based on cryptographic communications channels with a remote host and to transfer the funds to that host.

17. A system comprising:
a first postage machine comprising:
a first postal security device storing funds;
a first franking device dispensing postage from funds stored in the first postal security device; and
a first funds transfer device transferring funds between the first postal security device and a second postal security device in a second postage machine;
wherein the transferred funds correspond to a payment from a user of the first postage machine to a user of the second postage machine.

18. The system of claim 17, wherein the user of the first postage machine is a buyer, the user of the second postage machine is a seller, and the transferred funds correspond to a payment for at least one of merchandise and service provided by the seller to the buyer.

19. The system of claim 17, further comprising:
the second postage machine, comprising:
the second postal security device storing funds;
a second franking device dispensing postage from funds stored in the second postal security device; and
the second funds transfer device transferring funds between the first postal security device and the second postal security device.

20. The system of claim 17, further comprising a clearinghouse in communication with the first and second postage machines, the clearinghouse brokering payment services between the first and second postage machines during the funds transfer.

21. The system of claim 17, further comprising automated services equipment accepting postage dispensed by the first postage machine and the second postage machine as payment for at least one of merchandise and service provided by the automated services equipment.

22. The system of claim 17, wherein the first postage machine transferring funds between the first postal security device and a remote account of at least one of the buyer and the seller.

* * * * *